Sept. 28, 1948.　　J. H. BURRELL ET AL　　2,450,080
POWER TAKE OFF DEVICE

Filed Sept. 26, 1947　　3 Sheets-Sheet 1

J. H. Burrell
P. E. Richey
INVENTORS,

BY
ATTORNEYS.

Sept. 28, 1948. J. H. BURRELL ET AL 2,450,080
POWER TAKE OFF DEVICE
Filed Sept. 26, 1947 3 Sheets-Sheet 2

J. H. Burrell
P. E. Richey
INVENTORS,

BY *C. A. Snowles.*
ATTORNEYS.

Sept. 28, 1948. J. H. BURRELL ET AL 2,450,080
POWER TAKE OFF DEVICE
Filed Sept. 26, 1947 3 Sheets-Sheet 3

J. H. Burrell
P. E. Richey
INVENTORS,
BY
ATTORNEYS.

Patented Sept. 28, 1948

2,450,080

UNITED STATES PATENT OFFICE 2,450,080

POWER TAKE-OFF DEVICE

James H. Burrell and Paul E. Richey,
Rocky Ford, Colo.

Application September 26, 1947, Serial No. 776,344

4 Claims. (Cl. 74—242.16)

1

This invention relates to power take-off devices designed primarily as a means for taking off power from tractors.

In known tractor take-off mechanisms, it is necessary to cut off the power to the machine receiving power from the tractor, when the tractor is not in motion. It is, therefore, the primary object of the present invention to provide means to supply power to farm machinery continuously, whether the tractor supplying the power is in motion or not.

Another important object of the invention is to provide a power take-off coupled with the front end of the engine, delivering the power at the rear end of the engine for operating the mechanism associated therewith.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings.

Figure 1:
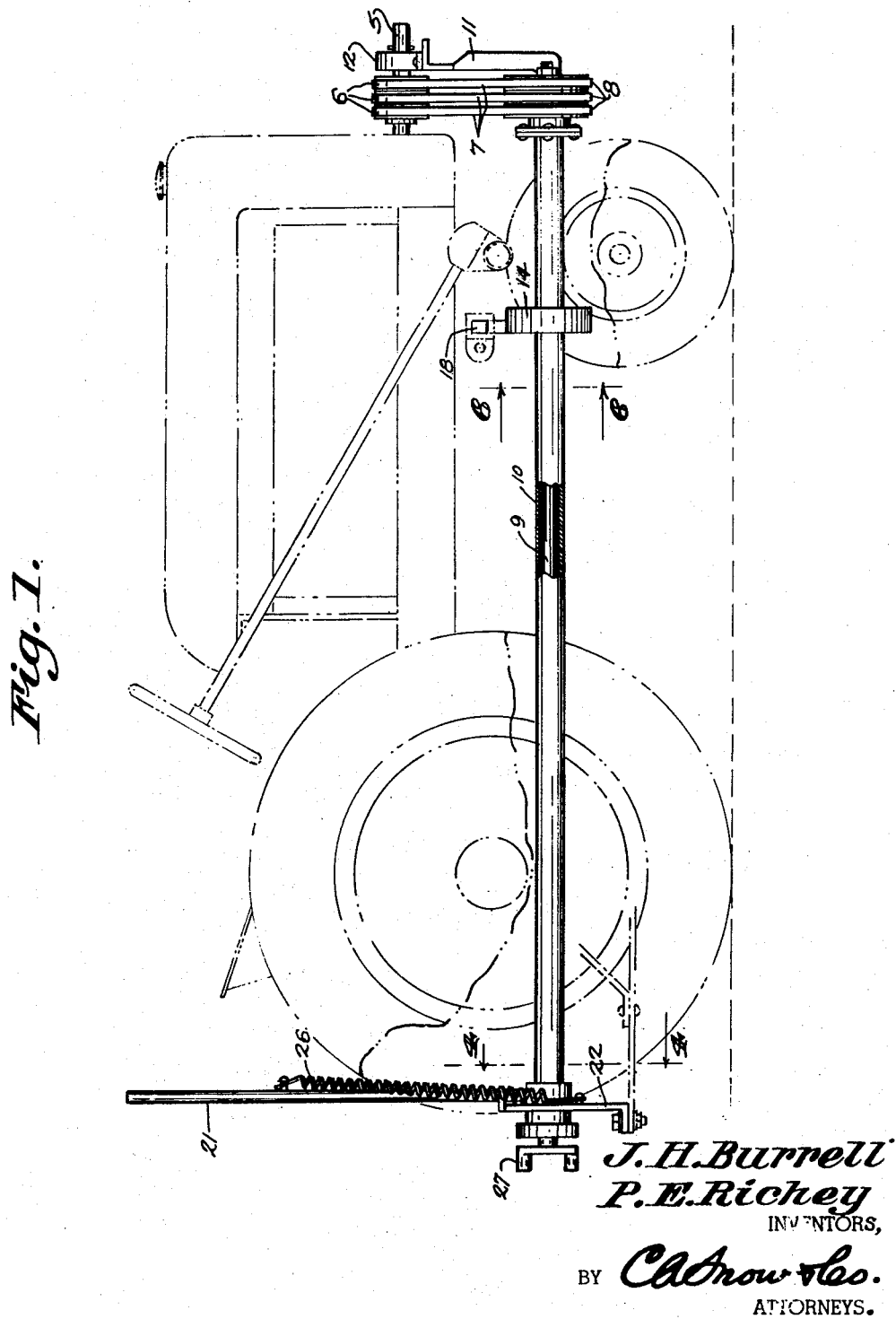
Figure 1 is an elevational view illustrating a power take-off mechanism constructed in accordance with the invention, a tractor being shown in dotted lines.
Figure 2:
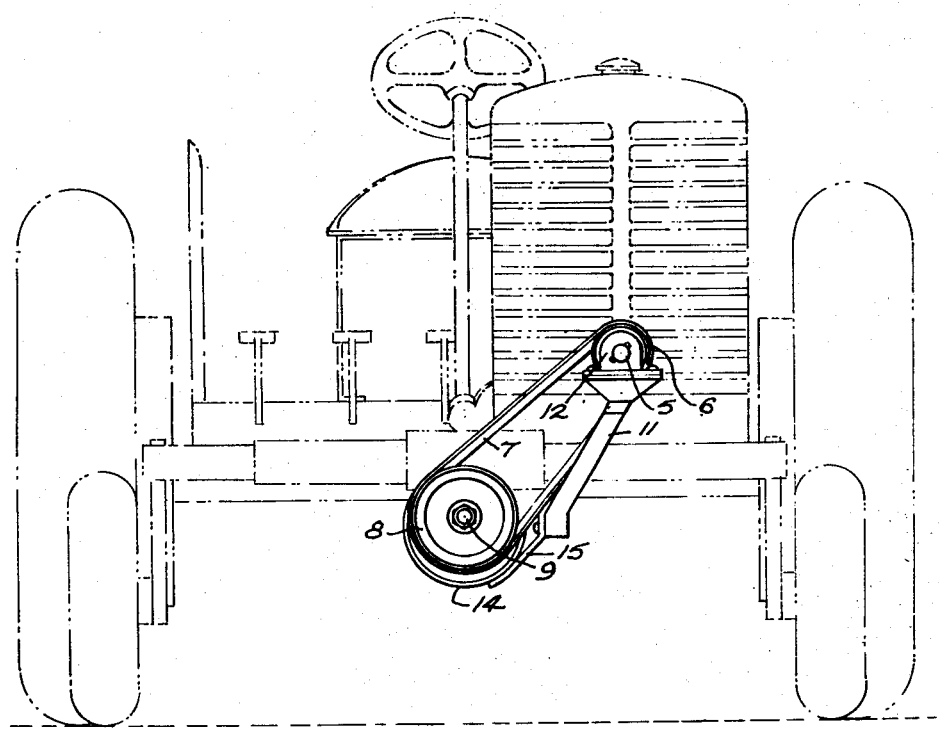
Figure 2 is a front elevational view of the power take-off mechanism.
Figure 6:
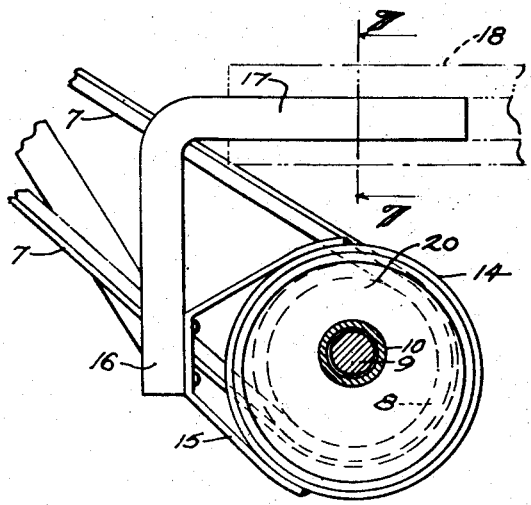
Figure 6 is a sectional view taken on line 6—6 of Figure 1.
Figure 7:
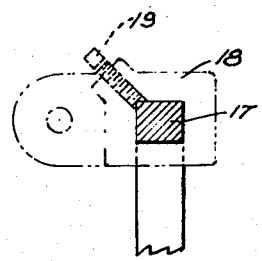
Figure 7 is a sectional view taken on line 7—7 of Figure 6.
Figure 3:
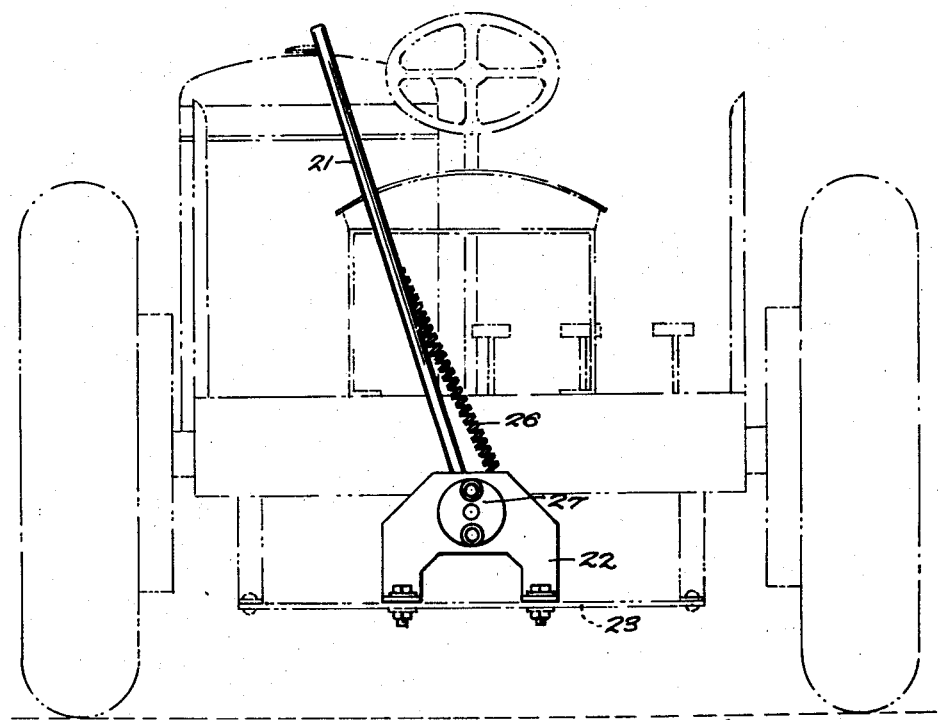
Figure 3 is a rear elevational view thereof.
Figure 4:
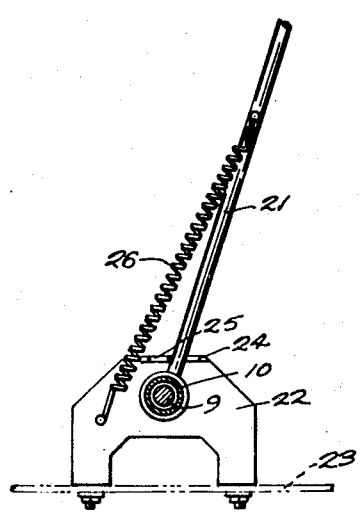
Figure 4 is a sectional view taken on line 4—4 of Figure 1.
Figure 5:
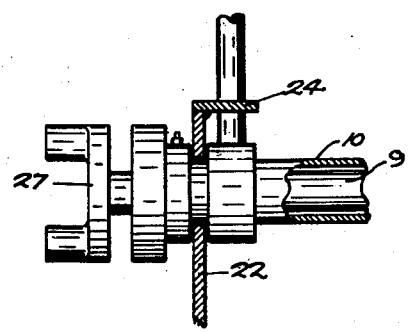
Figure 5 is an enlarged fragmental elevational view illustrating the coupling at one end of the power take-off mechanism.

Referring to the drawings in detail, the reference character 5 indicates the forward end of the crank shaft of the tractor, the shaft being usually supplied with the cranking handle, not shown.

Secured to the forward end of the crank shaft 5 are pulleys 6 which are of the V-groove type, to accommodate the V-belts 7 that operate over the substantially large pulleys 8, which are secured to the power shaft 9 of the power take-off mechanism.

The power shaft 9 is encased in the tubular housing 10 that extends the full length of the tractor, the front end extending to a point adjacent to the pulleys 8, while the rear end thereof extends beyond the rear of the tractor, as clearly shown by Figure 1. The reference character 11 indicates a bracket which is formed with the bearing 12 at its upper end, in which the shaft 5 rotates, the lower end of the bracket 11 being connected with the housing 10, supporting the forward end of the housing. Secured to the housing 10 is a circular housing 14 to which the arms 15 of the bracket 16 are welded, the bracket 16 having a right-angled end 17 fitted in an opening of the member 18 which is bolted to the tractor, the end 17 of the bracket 16 being square to fit within the square opening of the member 18, where it is held in place by means of the set screw 19. The housing 14 is provided with a disc 20 that operates therein, the disc 20 being formed with an opening through which the housing 10 extends, the opening being eccentrically formed within the disc, so that when the disc is rotated within the housing, the shaft 9 will be moved vertically to the end that the pulleys 8 at the ends thereof will be moved slightly to either cause slack in the belts 7 so that there will be slippage between the belts and pulleys, or tightened so that the belts will tightly engage the pulleys, transmitting movement from the shaft 5 to the shaft 9.

The operation of the tubular housing to accomplish this result, is carried out by means of the lever 21, which is shown as secured to the housing 10 adjacent to the take-off end of the power shaft 9.

The housing 10 operates in an opening formed in the bracket 22, which is bolted to the bar 23 of the tractor frame.

The bracket 22 has an inwardly extended flange 24 formed with notches 25 that accommodate the lever 21 to hold the lever in its positions of adjustment. A coiled spring indicated by the reference character 26 has one of its ends connected to the bracket 22, while the opposite end thereof connects with the lever 21 to normally pull the lever 21 in one direction to secure it in its positions of adjustment. On one end of the power shaft 9 is a coupling 27 which may be connected with any suitable mechanism to be operated by the device.

From the foregoing it will be seen that due to the construction shown and described, I have provided means whereby the power shaft 9 may be readily and easily clutched or unclutched with respect to the crank shaft 5, either while the tractor is stationary, or while the tractor is moving.

Having thus described the invention, what is claimed is:

1. The combination with the crank shaft of a tractor, of a power take-off comprising pulleys secured to the crank shaft, a tubular power shaft housing mounted on the tractor, a power shaft mounted within the tubular shaft housing, pulleys on the power shaft, belts operating over the pulleys of the crank shaft, transmitting movement of the crank shaft to the power shaft, a support for the tubular power shaft housing, comprising a circular housing, a bracket to which the circular housing is secured, the bracket being secured to the tractor, a disc eccentrically secured to the power shaft housing, fitted within the circular housing, and means for rotating the tubular power shaft housing and disc within the circular housing, whereby the pulleys of the power shaft are moved towards or away from the pulleys of the crank shaft, loosening or tightening the belts, and regulating the operation of the power shaft.

2. The combination with the crank shaft of a tractor, of a power take-off comprising pulleys secured to the crank shaft, a tubular power shaft housing mounted for pivotal movement on the tractor and extending from the front end of the tractor to the rear end thereof, a power shaft mounted within the power shaft housing, pulleys on the power shaft, belts moving over the pulleys, transmitting movement from the crank shaft to the power shaft, and means for moving the tubular shaft housing and power shaft supported therein, towards or away from the crank shaft, regulating the tension on the belts, controlling the operation of the power shaft.

3. The combination with the crank shaft of a tractor, of a power take-off comprising pulleys secured to the crank shaft, a tubular power shaft housing mounted on the tractor, directly under the tractor, a power shaft mounted within the tubular housing, pulleys mounted on the power shaft, belts operating over the pulleys transmitting movement of the crank shaft to the power shaft, a lever connected with the power shaft housing by means of which the tubular shaft housing is rotated, a circular bracket in which the tubular shaft housing is eccentrically mounted, whereby rotary movement of the power shaft housing moves the pulleys of the power shaft towards or away from the pulleys of the crank shaft, tightening or loosening the belts, controlling the rotation of the pulleys and power shaft.

4. The combination with the crank shaft of a tractor, of a power take-off comprising pulleys secured to the crank shaft, a tubular power shaft housing mounted on the tractor, a power shaft operating within the tubular power shaft housing, pulleys secured to the forward end of the power shaft, belts operating over the pulleys, the rear end of the power shaft extending beyond the rear end of the tractor, means for moving the forward end of the power shaft towards or away from the crank shaft, regulating the tension on the belts, whereby the operation of the power shaft is regulated.

JAMES H. BURRELL.
PAUL E. RICHEY.

REFERENCES CITED

The following references are of record in the file of this patent:

UNITED STATES PATENTS

| Number | Name | Date |
|---|---|---|
| 1,323,490 | Putnam | Dec. 2, 1919 |
| 2,140,687 | Brown | Dec. 20, 1938 |